US012778119B2

(12) United States Patent
Bignozzi

(10) Patent No.: US 12,778,119 B2
(45) Date of Patent: Nov. 3, 2026

(54) ANTIMICROBIAL POLYMERIC COMPOSITION

(71) Applicant: DEBx Medical Holding B.V., Amsterdam (NL)

(72) Inventor: Carlo Alberto Bignozzi, Ferrara (IT)

(73) Assignee: DEBx Medical Holding B.V., Amsterdam (NL)

( * ) Notice: Subject to any disclaimer, the term of this patent is extended or adjusted under 35 U.S.C. 154(b) by 389 days.

(21) Appl. No.: 18/546,784

(22) PCT Filed: Feb. 18, 2022

(86) PCT No.: PCT/EP2022/054100
§ 371 (c)(1),
(2) Date: Aug. 17, 2023

(87) PCT Pub. No.: WO2022/175464
PCT Pub. Date: Aug. 25, 2022

(65) Prior Publication Data
US 2024/0315241 A1 Sep. 26, 2024

(30) Foreign Application Priority Data
Feb. 19, 2021 (IT) ........................ 102021000003893

(51) Int. Cl.

| | |
|---|---|
| ***A01N 33/12*** | (2006.01) |
| ***A01N 25/10*** | (2006.01) |
| ***A01N 43/74*** | (2006.01) |
| ***A01N 59/16*** | (2006.01) |
| ***A01P 1/00*** | (2006.01) |

(52) U.S. Cl.
CPC ............. *A01N 33/12* (2013.01); *A01N 25/10* (2013.01); *A01N 43/74* (2013.01); *A01N 59/16* (2013.01); *A01P 1/00* (2021.08)

(58) Field of Classification Search
CPC .... A61K 45/06; A61K 31/198; A61K 9/0034; A61K 33/38; A61K 38/16; A61K 9/0043; A61K 9/0073; A61K 9/10; A61K 47/26; A61K 9/007; A61K 31/155; A61K 31/14; A61K 33/30; A61K 2300/00; A61K 47/36; A61K 9/06; A61K 31/722; A61K 33/00; A61K 31/10; A61K 31/167; A61K 31/337; A61K 31/407; A61K 31/444; A61K 31/445; A61K 31/496; A61K 31/58; A61K 31/616; A61K 31/635; A61K 31/69; A61K 31/7028; A61K 31/727; A61K 31/728; A61K 31/737; A61K 33/24; A61K 33/245; A61K 33/34; A61K 35/28; A61K 38/06; A61K 38/4893; A61K 47/12; A61K 47/183; A61K 47/20; A61K 47/585; A61K 8/46; A61K 9/0019; A61K 9/0048; A61K 9/0063; A61K 9/107; A61K 9/1641; A61K 9/1652; A61K 9/51; A61K 9/5161; A61P 31/12; A61P 31/14; A61P 31/16; A61P 1/02; A61P 11/02; A61P 13/02; A61P 17/00; A61P 27/02; A61P 31/18; A61P 31/22; A61P 43/00; A61P 31/04; A61P 31/10; A01N 2300/00; A01N 25/10; A01N 33/12; A01N 41/04; A01N 43/74; A01N 59/16; A01P 1/00
See application file for complete search history.

(56) References Cited

U.S. PATENT DOCUMENTS 8,409,608 B2 * 4/2013 Kim ........................ A61L 15/46
424/447

FOREIGN PATENT DOCUMENTS

| | | | | | |
|---|---|---|---|---|---|
| EP | 0727427 | A1 | | 8/1996 | |
| WO | 2014/153238 | A9 | | 9/2014 | |
| WO | WO2016040529 | | * | 3/2016 | ............. A01N 25/08 |
| WO | WO2016040529 | A1 | * | 3/2016 | ............. A01N 25/08 |
| WO | 2017/061878 | A1 | | 4/2017 | |
| WO | 2019/046834 | A1 | | 3/2019 | |
| WO | WO2019135136 | A1 | * | 7/2019 | ............... A61K 9/00 |
| WO | 2021/096897 | A1 | | 5/2021 | |

OTHER PUBLICATIONS

Zhu; "Structure and Activity of the Camellia oleifera Sapogenin Derivatives on Growth and Biofilm Inhibition of *Staphylococcus aureus* and *Escherichia coli*", J. Agric. Food. Chem. 2019, 67, 14143-14151 (Year: 2019).*

* cited by examiner

*Primary Examiner* — Audrea B Coniglio
(74) *Attorney, Agent, or Firm* — Ipsilon USA—NLO

(57) ABSTRACT

Polymeric composition having antimicrobial activity, said composition being a polymeric salt of a anionic polystyrene sulfonate and a cationic component, wherein said cationic component is selected from the group consisting of benzalkonium cations and positively charged micellar derivatives comprising benzalkonium cations and a silver complex. The composition may be included in alcoholic solution, that may be used for producing antimicrobial and antiviral coatings for objects and hand sanitizer gels.

6 Claims, 6 Drawing Sheets

ANTIMICROBIAL POLYMERIC COMPOSITION

FIELD OF THE INVENTION

The invention concerns polymeric compositions having antimicrobial activity, in particular antiviral, with high effectiveness. Said compositions may be used to prepare personal care products, such as hand gel, as well as coatings intended for frequently touched objects, such as handles, seats, air filter, medical equipment and protective face masks.

BACKGROUND ART

The global COVID-19 pandemic has highlighted the need for increasingly effective methods and technologies to contain the diffusion of pathogenic microorganisms, and more specifically the diffusion of viruses. Transmission through contaminated surfaces has been recognise as an important mean of diffusion of SARS-COV-2. Among the various available antimicrobial agents, antimicrobial polymers represent a class of biocides which has become increasingly important as an alternative to known biocides. Known disinfectants are based on liquids or gases with a low molecular weight, hence their use is limited by their volatility and by the toxicity of their residues. Antimicrobial polymers can be bound to surfaces, allowing for killing of microorganisms without releasing biocides. Many of the antimicrobial polymers known in the art were focused on antibacterial properties, while less attention was given to antiviral properties.

Antimicrobial polymers have been known since 1965, when Cornell and Donaruma described polymers and copolymers that kill bacteria (Cornell, R. J.; Donaruma, L. G. J. Med. Chem. 1965, 8, 388-390). Since then, many reports have appeared in (patent and scientific) literature describing bactericidal coatings which incorporate unbound biocidal agents, such as metallic oxide particles (WO2008127200A1), chlorine dioxide (Leung, W. K.; Lau, A. P. S.; Yeung, K. L., J. Appl. Microbiol. 106 (2009) 1463-1472), iodine compounds (Ahmed, S. I.; Hasan, N.; Abid, C. Z; Mazumdar, N., J. Appl. Polymer Science 109 (2008) 775; Punyani, S; Narayanan, P.; Vasudevan, P.; Singh, H.; J. Appl. Polymer Science 103 (2007) 3334), silver nanoparticles (WO2008063680A2) or benzophenone (Hong, K. H.; Sun, G., J. Applied Polymer Science 112 (2009) 2019) mixed with a polymeric matrix.

Furthermore, coatings comprising quaternary ammonium (QA) compounds are known. QA compounds are the antibacterial agents which are most largely employed for medical and public health applications, since they have shown to be effective against both Gram negative and Gram positive bacteria (Tashiro, T., Macromol. Mater. Eng. 286 (2001) 63-87). According to the literature (Felix Siedenbiedel e Joerg C. Tiller, Polymers 2012, 4, 46-71), three types of antimicrobial polymers are known: polymeric biocides, in which the monomer is a biocide; biocidal polymers, wherein the active agent is incorporated into a macromolecule in a casual manner; polymers that release biocides, wherein the polymer matrix acts as a vehicle for the biocides, which can be transferred to the target, for example a microbial cell.

In light of the importance currently attributed to antimicrobial compositions, in particular antiviral, in the field of personal care products, such as for example hand sanitizer gels, there is a clear need for improving the effectiveness of such compositions. In particular, among the experts in the field there is a strong need for compositions having an effective antimicrobial activity, in particular antiviral.

AIMS OF THE INVENTION

A aim of the invention is to improve known antimicrobial compositions, in particular antiviral.

Another aim is to provide antimicrobial compositions having an effective antiviral activity.

A further aim is to provide antimicrobial compositions which have an effective antiviral activity and that can be incorporated into personal care products, such as for example hand gel.

Yet another aim is to provide antimicrobial compositions which have an effective antiviral activity and that can be used to produce objects having an antimicrobial coating, in particular antiviral.

SUMMARY OF THE INVENTION

According to the invention, it is foreseen a polymeric composition having antimicrobial activity, as defined in claim 1.

Thanks to the invention, polymeric compositions showing an effective antimicrobial activity, in particular antiviral, are provided. The polymeric compositions according to the invention comprise a silver complex and/or benzalkonium ions bound to the polystyrene sulfonate matrix. Therefore, in the polymeric compositions according to the invention, the active principle (silver complex and/or benzalkonium ions) is incorporated into a macromolecule (polystyrene sulfonate).

The polymeric compositions according to the invention are insoluble in water but are suitably soluble in volatile organic solvents, namely alcohols. In this way, it is possible preparing stable alcoholic solutions that can be readily sprayed on a solid surface. Upon evaporation of the solvent, on the surface a tightly bonded, transparent film remains, which is provided with remarkable antimicrobial properties towards Gram-positive and Gram-negative bacteria, as well as fungi (*Candida albicans*). Thanks to the insolubility in water of the polymeric compositions according to the invention, the antimicrobial effect can be maintained for several months (from the date of application to a surface). In light of the fact that viruses can survive on inanimate surfaces for periods which vary from hours to several days, the Applicant has investigated the antiviral activity of said polymeric compositions. As a surprisingly unexpected effect, strong experimental evidence of antiviral activity of the polymeric compositions according to the invention has been reported. In particular, the antiviral activity has been experimentally tested and verified towards two members of the Coronaviridae family, namely human Coronavirus 229E (HCoV-229E), which is the etiological agent of common cold, and human SARS-Cov-2, which is the etiological agent of COVID-19.

The polymeric compositions according to the invention can be suitably incorporated into coatings intended for frequently touched objects, such as seats, handles, door knobs or keyboards, as well as devices for professional use, such as medical equipment and protective face masks. Said polymeric compositions may be used to coat filters for air decontamination devices and for air conditioning devices, for example in cars and buildings. A treatment of surfaces with the polymeric compositions according to the invention allows to prevent unwanted and potentially dangerous microbial contamination, in particular viral, of the surfaces. Furthermore, the polymeric compositions according to the invention can be suitably included in formulations of hand sanitizer gels, the use of which has become increasingly important due to the COVID-19 global pandemic.

BRIEF DESCRIPTION OF THE DRAWINGS

The invention will be better understood and implemented with reference to the attached drawings which illustrate an exemplary and non-limiting form of implementation, of which.

DETAILED DESCRIPTION OF THE INVENTION

Figure 1:
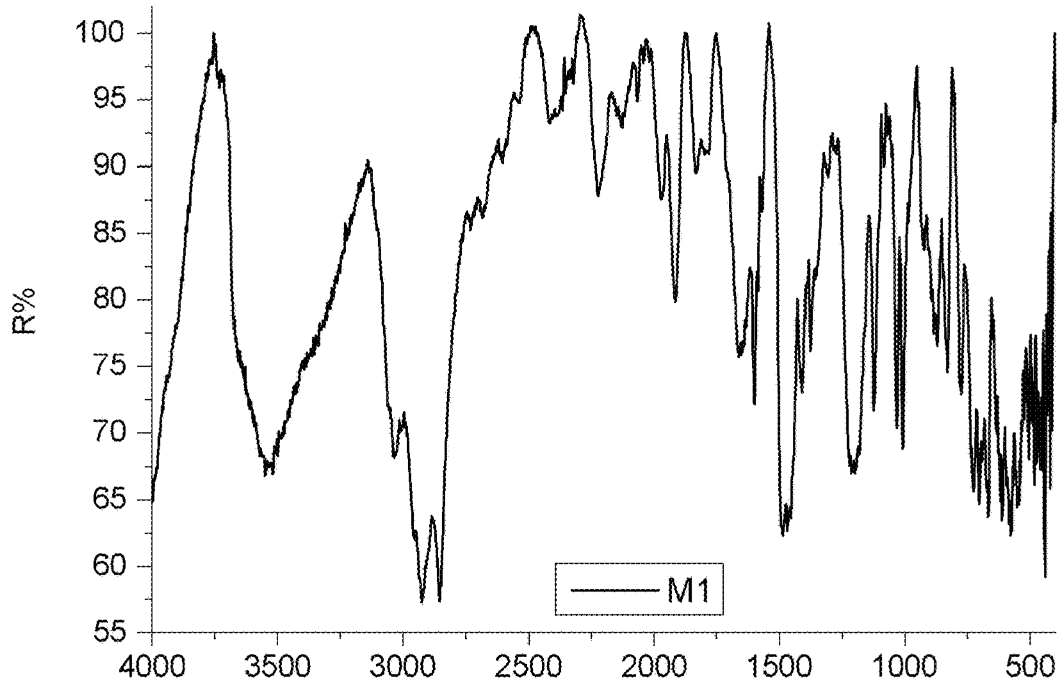
FIG. 1 is a graph showing the FT-IR spectrum of an embodiment of the polymeric composition according to the invention.

In the present description, as well as in the attached claims:

- the term "silver cation" and the corresponding chemical symbol "$Ag^+$" can be used interchangeably;
- the term "silver complex" is defined as a complex of a silver cation, having the corresponding chemical symbol $Ag^+$, and one or more anions, preferably an organic anion, such as one or more ligands, preferably one or more anionic organic ligands.
- the terms "benzalkonium ion" and "benzalkonium cation" and the symbol "$Bz^+$" can be used interchangeably;
- the terms "polystyrene sulfonate" and "poly(sodium 4-styrene sulfonate)" and the abbreviation "PSS" can be used interchangeably;
- the term "antimicrobial" defines the ability of a substance, or a mixture of substances, to kill microorganisms in general and/or prevent their growth;
- the term "antiviral" defines the ability of a substance, or a mixture of substances, to kill viruses (virucidal activity).

In one embodiment, the polymeric composition according to the invention is a polymeric salt of anionic polystyrene sulfonate (PSS) and benzalkonium cations ($Bz^+$), wherein the benzalkonium cations are bonded to the PSS matrix.

Since in anionic PSS the acidic sulfonic groups (—$SO_3H$) are deprotonated to sulfonate anions (—$SO^{3-}$), the benzalkonium cations are electrostatically bonded to the sulfonate anions.

In another embodiment, the polymeric composition according to the invention is a polymeric salt of anionic polystyrene sulfonate (PSS) and positively charged micellar derivatives containing benzalkonium cations and a silver complex, wherein the positively charged micellar derivatives are electrostatically bonded to the sulfonate anions of the PSS matrix.

Therefore, the polymeric composition according to the invention is a polymeric salt of anionic polystyrene sulfonate (PSS) and a cationic component, wherein the cationic component is selected from the group consisting of benzalkonium cations and positively charged micellar derivatives containing benzalkonium cations and a silver complex.

The micellar derivatives can be prepared starting from a sodium salt of bi-coordinated silver complex having the formula $Na^{+3}[Ag^+(MPA^{2-})_2]^{3-}$, wherein $MPA^{2-}$ is the anionic bivalent form of 2-mercapto-4-methyl-5-thiazolacetic acid (MPA). $MPA^{2-}$ is obtained through deprotonation of carboxylic groups (—COOH) and mercapto (—SH) of MPA. The preparation of said sodium salt of the bi-coordinated silver complex is described in Example 1 below. The sodium salt of the bi-coordinated silver complex is then reacted with benzalkonium chloride, as described in Example 2 below.

With the purpose of facilitating the understanding of the invention, but without limiting its scope, the following Examples are described: preparation of a sodium salt of bi-coordinated silver complex having the formula $Na^{+3}[Ag^+(MPA^{2-})_2]^{3-}$ (Example 1); preparation of micellar derivatives of $(Bz^+)_3[Ag^+(MPA^{2-})_2]^{-3}$ (Example 2); preparation of polymeric compositions (polymeric salts M-1 and M-2) according to the invention (Example 3); evaluation of the antimicrobial activity of the sodium salt of bi-coordinated silver complex having the formula $Na^{+3}[Ag^+(MPA^{2-})_2]^{3-}$ in aqueous solution (Example 4); evaluation of the antimicrobial activity of micellar derivatives of $(Bz^+)_3[Ag^+(MPA^{2-})_2]^{-3}$ in aqueous solution (Example 5); evaluation of the antimicrobial activity of M-1 and M-2 (Example 6); evaluation of the antiviral effectiveness of $Na^{+3}[Ag^+(MPA^{2-})_2]^{3-}$ in aqueous solution towards SARS-Cov2 (Example 7); evaluation of the antiviral effectiveness of M-1 towards Coronavirus 229E (Example 8); evaluation of the antiviral effectiveness of M-1 towards SARS-Cov2 (Example 9); evaluation of the antiviral effectiveness of M-2 towards SARS-Cov2 (Example 10).

With reference to the described Examples, all chemical products were bought from Sigma-Aldrich. Elemental analysis (C, H, N) was carried out with a LECO-CHN analyser. Silver was determined by plasma atomic absorption spectroscopy with an instrument Perkin Elmer Optima 3100 XL. FT-IR spectra were recorded with a spectrometer FT-IR Bruker Vertex 70 in diffuse reflectance mode and dispersing the powder of chemical products in KBr. Dimensional analysis and Zeta potential were obtained with a Z-sizer Malvern analyser.

Example 1—Preparation of Sodium Salt of Bi-Coordinated Silver Complex $Na^{+3}[Ag^{+}(MPA^{2-})_2]^{3-}$ 12.36 g of a 1M NaOH solution in water were added to an amount of 1.135 g of MPA. 186.5 g of distilled water were then added and the solution was maintained under stirring for 5 min. Finally, 100 g of aqueous solution containing 0.51 g of $AgNO_3$ were added, yielding a yellow solution which was maintained under stirring for another 30 min. The salt of bi-coordinated silver complex $Na^{+3}[Ag^{+}(MPA^{2-})_2]^{3-}$ was precipitated by addition of an acetone excess, filtered and air dried. $Ag^{+}$%=0.108%. Elemental analysis: calculated for $Na_3AgC_{12}N_2S_4O_4H_{10}$; C, 26.14; N, 5.08; H, 1.83; Ag, 19.57. Found: C, 25.87; N, 5.0; H, 1.88; Ag, 19.46.

Elemental analysis and spectroscopic data for the silver complex are coherent with the presence of two anionic ligands $MPA^{2}$– coordinated to ions $Ag^{+}$. The -IR spectrum of MPA shows a strong CO stretching band of the carboxylic group at 1704±2 $cm^{-1}$ and a stretching band S—H at 2555±2 $cm^{-1}$. The S—H stretching band disappears in the anionic silver complex, which is coherent with sulphur coordination to $Ag^{+}$. Intense bands due to asymmetric and symmetric stretching modes of carboxylate appear at 1580±2 $cm^{-1}$ e 1386±2 $cm^{-1}$, respectively.

Example 2—Preparation of Micellar Derivatives (M-0) of $(Bz^{+})_3[Ag^{+}(MPA^{2-})_2]^{-3}$ Benzalkonium (Bz) is a mixture of quaternary ammonium salts (cationic surfactants) and, more specifically, is a mixture of alkyl-benzyl-dimethyl-ammonium chlorides, in which the alkyl group varies from octyl ($C_8H_{17}$—) to octadecil ($C_{18}H_{37}$—). The average molecular weight of benzalkonium chloride salt is 370 g. Adding a small excess of benzalkonium chloride to an aqueous solution of $Na^{+}_3[Ag^{+}(MPA^{2-})_2]^{3-}$ (salt of bi-coordinated silver complex) of Example 1, the uncharged salt $Bz^{+})_3[Ag^{+}(MPA^{2-})_2]^{-3}$ can be suitably precipitated. The addition of benzalkonium chloride to the anionic silver complex $[Ag^{+}(MPA^{2-})_2]^{3-}$ in water gives rise to the neutralization of the negative charge with formation of a precipitate which is coherent with the stoichiometry $(Bz^{+})_3[Ag^{+}(MPA^{2-})_2]^{-3}$ (salt of the anionic silver complex).

Through further addition of an excess of benzalkonium chloride to the precipitated salt in water, $(Bz^{+})_3[Ag^{+}(MPA^{2-})_2]^{-3}$ is dissolved by formation of positively charged micellar derivatives (hereinafter referred to as "M-0"), caused by the excess of surrounding $Bz^{+}$ cations, with a dimensional distribution in the range 10-500 nm.

On the laboratory scale, the above-described micellar derivatives can be prepared by addition of 100 g of a 50% benzalkonium chloride solution in water to 100 g of the $Na^{+}_3[Ag^{+}(MPA^{2-})_2]^{3-}$ solution with silver at 0.108% (prepared as described in Example 1).

Example 3—Preparation of Polymeric Compositions (Polymeric Salts M-1 and M-2) According to the Invention Polymeric salts (neutral polymers) of positively charged micellar derivatives of $(Bz^{+})_3[Ag^{+}(MPA^{2-})_2]^{-3}$ (hereinafter referred to as "M-1") of Example 2 and polymeric salts (neutral polymers) of benzalkonium ions (hereinafter referred to as "M-2") were obtained as precipitates in distilled water by addition of poly(sodium 4-styrene sulfonate) (PSS) with an average molecular weight of 70,000 g. Practically, the polymeric salt M-1 can be obtained by adding PSS to the micellar derivatives of Example 2, said addition being performed with a quantity by weight of PSS equal to about 60% of the weight of benzalkonium chloride, while the polymeric salt M-2 can be obtained by adding an excess of benzalkonium chloride to an aqueous solution of PSS. Similarly to what described above with reference to M-1, that corresponds to an addition of a quantity by weight of PSS equal to about 60% of the weight of benzalkonium chloride.

The neutral precipitated polymers M-1, containing PSS, $[Ag^{+}(MPA^{2-})_2]^{-3}$ and $Bz^{+}$ ions electrostatically bonded to sulfonate groups, and M-2, containing PSS and Bz+ ions electrostatically bonded to sulfonate groups, were separated from the aqueous solutions by filtration and were dried at 50° C. both M-1 and M-2 are insoluble in water, but are suitably soluble in alcoholic solvents. Thus, the polymeric solids were dissolved in isopropanol or ethanol to obtain a solution of M-1, containing 1% Bz, 0.62% PSS and 0.002% Ag, and a solution of M-2, containing 1% Bz and 0.62% PSS.

The solutions of M-1 in alcohol are composed by micellar aggregates (micellar derivatives) with diameters in the order of 10 nm and zeta potential of −3.9 mV. A minority of aggregates with diameter in the order of 50 and 500 nm was also observed. Infrared spectra of the polymeric solids M-1 and M-2 are similar, with vibrational bands concordant with the overlap of the intense bands of benzalkonium and PSS. As example, the FT-IR spectrum of M-1 is shown in FIG. 1.

Figure 2:
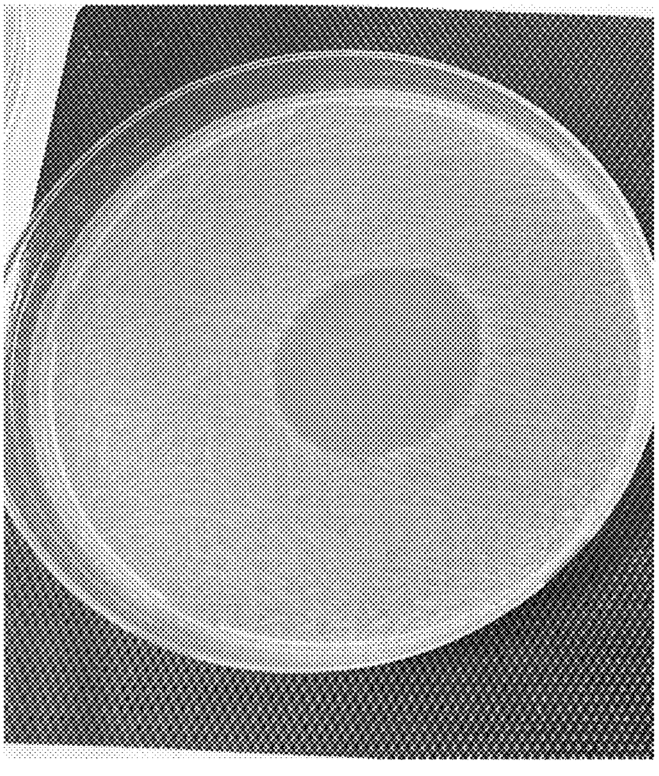
FIG. 2 is a photograph of a Petri dish, showing the antimicrobial activity of an aqueous solution of the sodium salt of a silver complex contained in the polymeric composition according to the invention.

Example 4—Evaluation of the Antimicrobial Activity of the Sodium Salt of Bi-Coordinated Silver Complex $Na^{+3}[Ag^{+}(MPA^{2-})_2]^{3-}$ in Aqueous Solution The antimicrobial activity of an aqueous solution at pH 8.3 of $Na^{+3}[Ag^{+}(MPA^{2-})_2]^{3-}$ with an ionic concentration of [Ag+]=0.1% was tested against the following blend of microorganism strains (bought from Diagnostic International Distribution S.p.A): *Pseudomonas aeruginosa* ATCC 15442, *Staphylococcus aureus* ATCC 6538, *Escherichia coli* ATCC 10536, *Enterococcus hirae* ATCC 10541 e *Candida albicans* ATCC 10231. For each microbial strain, the concentration of the blend was in the range $1.5\times10^{12}$-$5\times10^{12}$ unity forming colonies (UFC). A volume of 100 μl of the blend was seeded in Petri dishes containing a non-selective culture medium TSA (Tryptone Soya Agar) and a sample of 100 μl of said aqueous solution of $Na^{+3}[Ag^{+}(MPA^{2-})_2]^{3-}$ was put in the centre of each Petri dish in contact with the microbial blend. The Petri dishes were then incubated at 37° C. for 24 h. FIG. 2 shows the presence of a zone of inhibition (of the microbial growth) of circa 3 cm in one of the incubated Petri dishes, a zone which confirms the antimicrobial activity of the aqueous solution.

Example 5—Evaluation of the Antimicrobial Activity of Micellar Derivatives of $(Bz^{+})_3[Ag^{+}(MPA^{2-})_2]^{-3}$ (M-0) in Aqueous Solution The antimicrobial activity of a diluted aqueous solution of micellar derivatives—containing benzalkonium at 1% and silver at 0.0025%—was tested against the following blend of microorganism strains (bought from Diagnostic International Distribution S.p.A): *Pseudomonas aeruginosa* ATCC 15442, *Staphylococcus aureus* ATCC 6538, *Escherichia coli* ATCC 10536, *Enterococcus hirae* ATCC 10541 e *Candida albicans* ATCC 10231.

Figure 3:
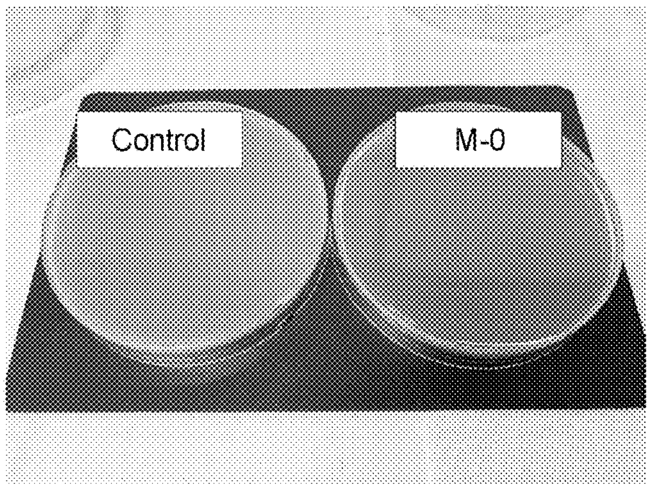
FIG. 3 is a photograph of a Petri dish, showing the antimicrobial activity of micellar derivatives containing the silver complex of FIG. 2 and benzalkonium.

Blends of the different strains of microorganisms were prepared, having concentrations between $1.5\times10^{12}$ and $5.5\times10^{12}$ UFC for each strain. A sample of 100 μl of the aqueous solution of micellar derivatives was deposited at the centre of Petri dishes. 50 μl of the microbial blend were then deposited on the aqueous solution of micellar derivatives and left in contact with the latter for 5 minutes. Non-selective culture medium TSA (Tryptone Soya Agar) was then added and the dishes were then incubated at 37° C. for 24 h. After incubation, the dishes were examined in order to evaluate microbial proliferation (formation of colonies). As shown in FIG. 3, while in the control Petri dish (Petri dish on the left, containing only the microorganisms strains) there was an homogenous microbial proliferation, in the Petri dish containing also the sample of aqueous solution of micellar derivatives no microbial proliferation was observed, which indicated a complete inactivation of microbial species.

Therefore, the analytical result obtained confirms that the diluted aqueous solution of micellar derivatives (containing benzalkonium at 1% and silver at 0.0025%) is able to inhibit the growth of about $10^{11}$ UFC Gram-positive bacteria, Gram-negative bacteria and of the fungal species *Candida albicans*.

Example 6—Evaluation of the Antimicrobial Activity of M-1 and M-2

The antimicrobial activity of M-1 (alcoholic solution containing Bz 1%, Ag 0.002%, PSS 0.62% and the rest to 100 being ethanol or isopropanol) and M-2 (alcoholic solution containing Bz 1%, PSS 0.62% and the rest to 100 being ethanol or isopropanol) was tested against the following microorganisms strains (bought from Diagnostic International Distribution S.p.A.): *Pseudomonas aeruginosa* ATCC 15442, *Staphylococcus aureus* ATCC 6538, *Escherichia coli* ATCC 10536, *Enterococcus hirae* ATCC 10541 and *Candida albicans* ATCC 10231.

Figure 4A:
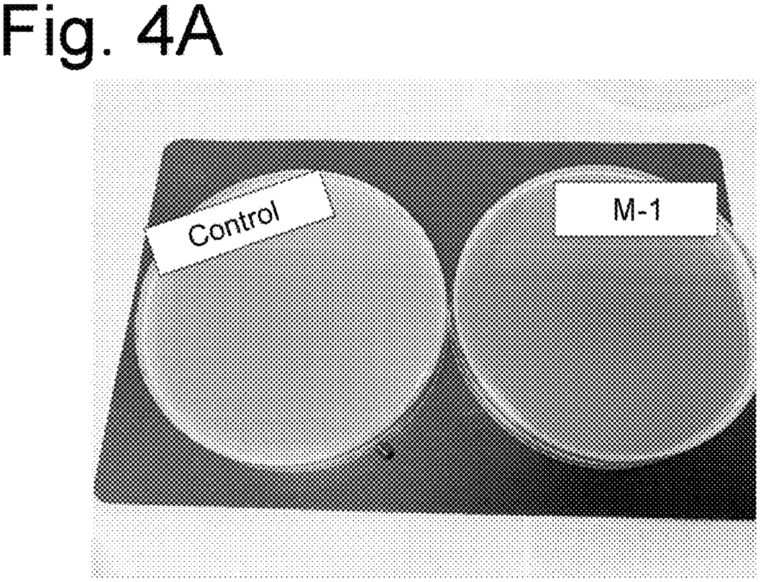
FIGS. 4A and 4B are two photographs of Petri dishes, showing the antimicrobial activity of two embodiments of the polymeric compositions according to the invention.
Figure 4B:
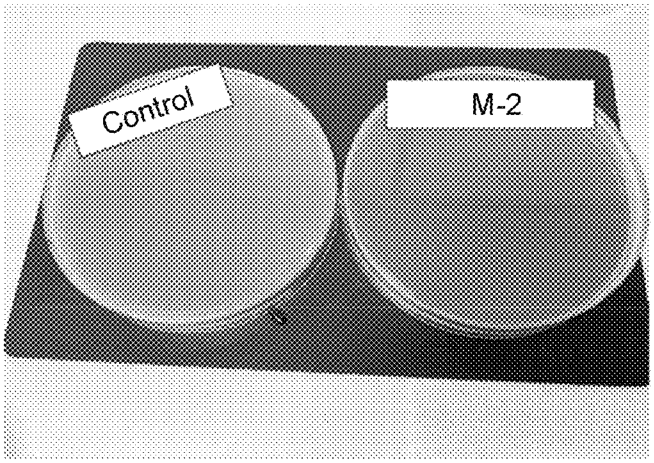

Blends of the different strains of microorganisms were prepared, having concentrations expressed as UFC between $1.5\times10^{12}$ e $5.5\times10^{12}$ for each species. Samples of 100 μl of the alcoholic solutions of M-1 and M-2 were deposited at the centre of Petri dishes and dried for 2 h in an oven at 37° C. 100 μl of the microbial blend were then added and left in contact with M-1 and M-2 for 5 minutes. Non-selective culture medium TSA (Tryptone Soya Agar) was added and the Petri dishes were then incubated at 37° C. for 24 h. After incubation, the dishes were examined in order to evaluate microbial proliferation (colonies formation). As shown in FIGS. 4A and 4B, while in the control Petri dish (containing only the microorganisms strains) there was an homogenous microbial proliferation, in the Petri dish containing M-1 (FIG. 4A, right) and M-2 (FIG. 4B, left) no proliferation was observed, which indicated a complete inactivation of 1.5-$5\times10^{11}$ UFC Gram-positive and Gram-negative bacteria, as well as of the fungal species *Candida albicans*.

Example 7—Evaluation of the Antiviral Effectiveness of $Na^{+3}[Ag^{+}(MPA^{2-})_2]^{3-}$ in Aqueous Solution Towards SARS-Cov2

The experiments were performed in a BSL-3 facility at the University of Ferrara (Italy). An aqueous solution containing $Na^{+3}[Ag^{+}(MPA^{2-})_2]^{3-}$ with a concentration of Ag+ of 0.108% was sprayed onto disposable plastic Petri dishes and left to dry in a biosafety cabinet. Then, 1 ml of SARS-Cov-2 inoculum was incubated on each Petri dish for 5 minutes. After treatment, the virus for used to inoculate sensitive cells (VeroE6; ATCC® CRL-1586™). Cellular supernatants were collected at 24, 48, and 72 hours post-infection to evaluate viral replication. As a positive control a untreated viral inoculum was used. The replication of SARS-Cov-2 was estimated by qRT-PCR after extraction of RNA. The cytopathic effect in the infected cells was assessed by optical microscopy (Nikon inverted microscope).

Figure 5:
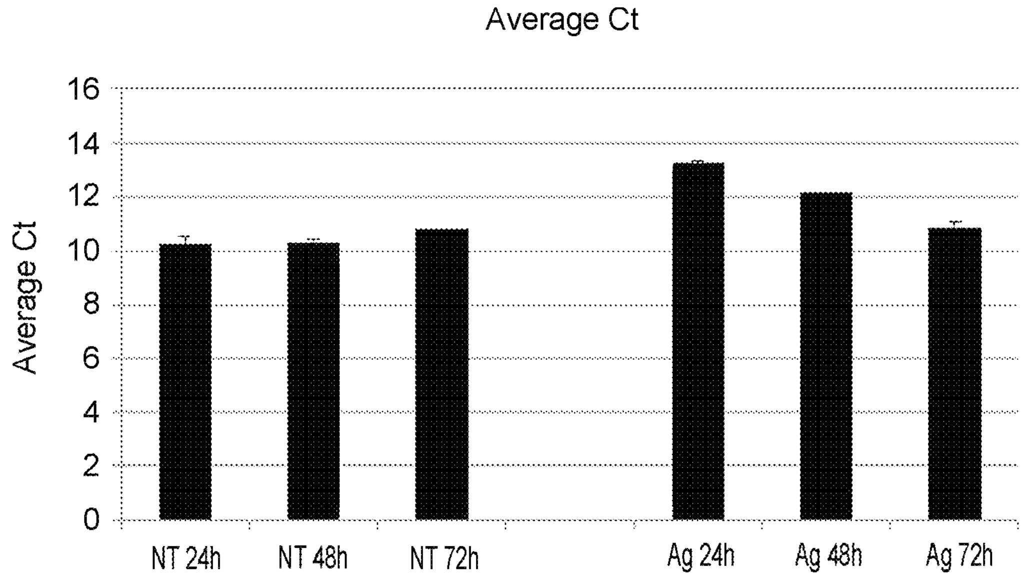
FIG. 5 is a graph showing the increase in threshold cycles (Ct) required to detect RNA of SARS-Cov-2 treated with the silver complex of FIG. 2 and then inoculated in cells sensitive to the virus.

Analytical results were expressed as threshold cycle (Ct), namely the number of cycles of qRT-PCR required for the fluorescent signal to exceed the threshold value, a number which is inversely proportional to the amount of viral RNA. In other words, Ct is the cycle in which the target becomes detectable. The average Ct is shown in the graph of FIG. 5, in which "NT" stands for "non-treated" (i.e. control) and "Ag" stands for "treated with the aqueous solution containing $Na^{+}_3[Ag^{+}(MPA^{2-})_2]^{3-}$".

Table 1 below shows the replication of SARS-Cov2 in VeroE6 cells after treatment with aqueous solution containing Ag, a replication which is expressed as logarithmic difference between the untreated control. The pre-treatment of SARS-Cov2 with the aqueous solution containing Ag caused a significant decrease of 0.91 logarithms of the viral charge at 24 h post-infection (hpi), a decrease of 0.57 logarithms at 48 pci, while the reductions observed at a time more distant from the infection are not significant:

TABLE 1

| Samples | ΔCt | Logarithmic difference |
|---|---|---|
| Aqueous solution containing Ag 24 hpi | 3.04 | −0.91 |
| Aqueous solution containing Ag 48 hpi | 1.91 | −0.57 |
| Aqueous solution containing Ag 72 hpi | 0.61 | −0.18 |

Figure 6:
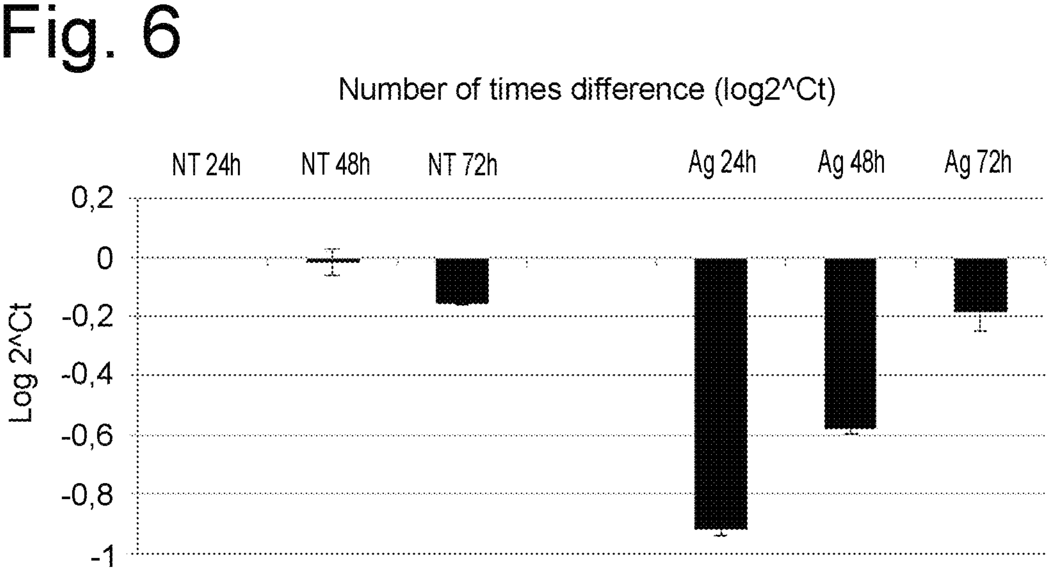
FIG. 6 is a graph showing the number of times difference in the viral replication of SARS-Cov-2, treated with the sodium salt of the silver complex of FIG. 2, compared to untreated SARS-Cov-2.

The graph of FIG. 6 represents the difference in viral replication after treatment with the solution containing Ag compared to the untreated virus. Concomitantly, a morphologic analysis of the infected cells was performed. The cells infected with the virus treated with the solution containing Ag exhibited a lower cytopathic effect compared to the cells infected with the untreated virus. This evidence occurred 48 hours post-infection. In conclusion, incubation of SARS-Cov2 for 5 minutes on surfaces that were treated with an aqueous solution containing Ag led to a logarithmic reduction of 0.91 logarithms at 24 hours post-infection. This reduction is responsible for a decrease in the cytopathic effect, as highlighted by morphologic observation at 48 hours post-infection.

Similar experiments were carried out on diluted aqueous solutions containing $Na^{+3}[Ag^{+}(MPA^{2-})_2]^{3-}$ with a concentration of $Ag^{+}$ of 0.002% and showed that the incubation of SARS-Cov2 for 5 minutes on surfaces treated with an aqueous solution containing Ag produced a reduction of 0.82 logarithms of the viral charge at 24 hours post-infection. The reduction was responsible for a small decrease of the cytopathic effect, as highlighted by morphologic observation at 72 hours post-infection.

Example 8—Evaluation of the Antiviral Effectiveness of M-1 Towards Coronavirus 229E The experiments were performed in a BSL-3 facility at the University of Ferrara (Italy). A solution in isopropanol of M-1 having the same composition reported in Example 6 (Bz 1%, Ag 0.002%, PSS 0.62%) was sprayed onto disposable plastic Petri dishes and left to dry in a biosafety cabinet. Then, 1 ml of human Coronavirus 229E (ATCC: VR-740) was incubated in each Petri dish for 5 minutes. After treatment, the virus was used to inoculate human sensitive cells (MRC-5, ATCC: CCL-171). Cellular supernatants were collected at 24 and 48 hours post-infection to evaluate viral replication. As a positive control a untreated viral inoculum was used. Viral replication was estimated by qRT-PCR after extraction of RNA.

Figure 7:
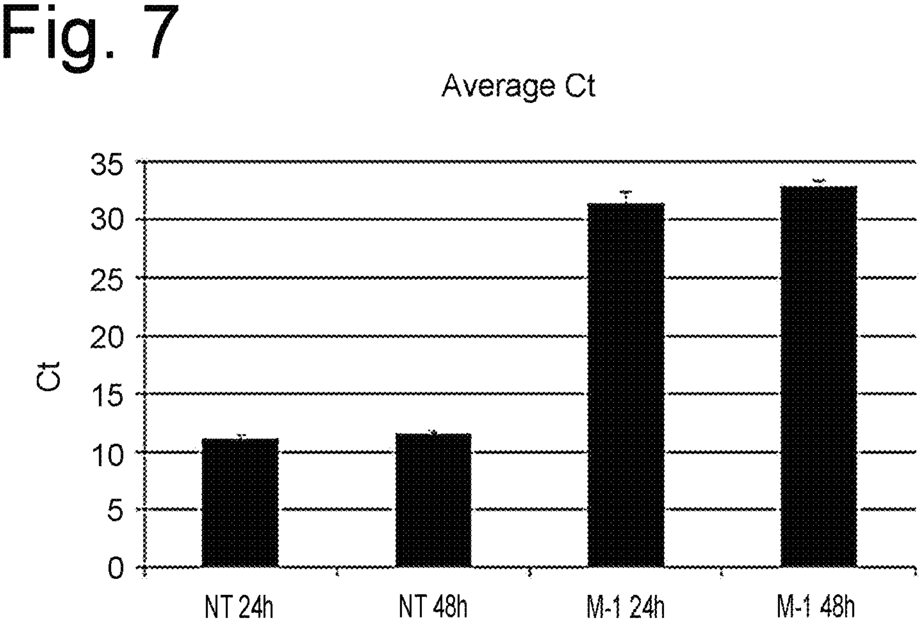
FIG. 7 is a graph showing the increase in threshold cycles (Ct) required to detect RNA of Coronavirus 229E treated with an embodiment of the polymeric composition according to the invention, containing the sodium salt of the silver complex of FIG. 2 and benzalkonium, and then inoculated in cells sensitive to the virus.

Analytical results are expressed as threshold cycles (Ct), namely the cycle in which the target becomes detectable. Average Ct is shown in the graph of FIG. 7, in which "nt" stands for "non-treated" (i.e. control) and "M-1" stands for "treated with M-1".

Table 2 below shows the replication of Coronavirus 229E in MRC-5 cells after treatment with M-1, replication which is expressed logarithmic difference compared to the untreated control. The pre-treatment of Coronavirus 229E with M-1 caused a reduction of 6.1 logarithms of the viral charge at 24 hours post-infection and a reduction of 6.5 logarithms at 48 hours post-infection:

TABLE 2

| Samples | Logarithmic difference | N. times difference |
|---|---|---|
| Untreated 24 h | 0 | 0 |
| Untreated 48 h | 0.4 | 1 |
| M-1 24 h | 6.1 | $-1.31 * 10^6$ |
| M-1 48 h | 6.5 | $-3.38 * 10^6$ |

Figure 8:
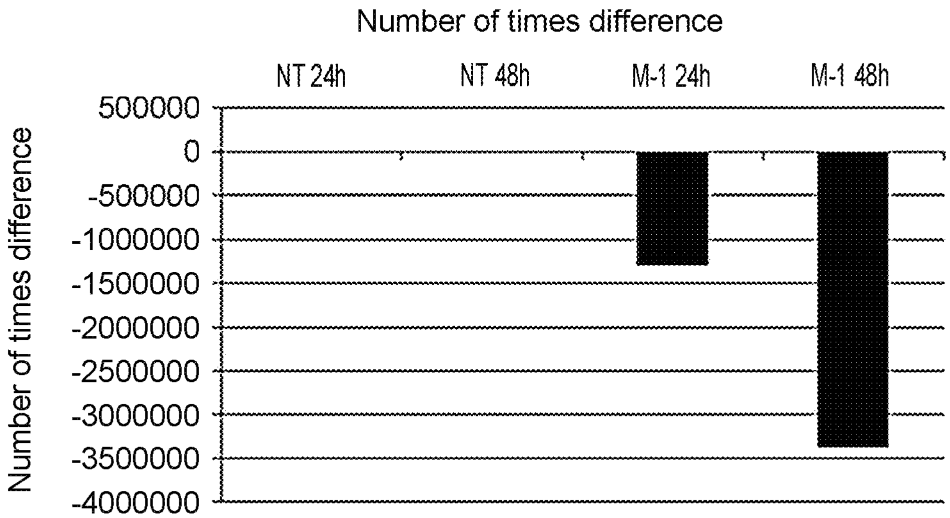
FIG. 8 is a graph showing the number of times difference in viral replication of Coronavirus 229E, treated with the embodiment of the polymeric composition of FIG. 7, compared to untreated Coronavirus 229E.

The graph of FIG. 8 represents the difference in viral replication after treatment with M-1 compared to the untreated virus. In conclusion, treatment of Coronavirus 229E with M-1 is able to cause a reduction of 6 logarithms of the viral infectivity.

Example 9—Evaluation of the Antiviral Effectiveness of M-1 Towards SARS-Cov-2

All experiments were performed in a BSL-3 facility. A solution of M-1 in isopropanol, with the same composition reported in Example 6 (Bz 1%, Ag 0.002%, PSS 0.62%), was sprayed onto disposable plastic Petri dishes and left to dry in a biosafety cabinet. Then, 1 ml of SARS-Cov-2 (ATCC: VR-740) was incubated in each Petri dish for 5 minutes. After treatment, the virus was used to inoculate human sensitive cells (VeroE6; ATCC® CRL-1586™). Cellular supernatants were collected at 24, 48 and 72 hours post-infection to evaluate viral replication. As a positive control a untreated viral inoculum was used. The replication of SARS-Cov-2 was estimated by qRT-PCR after extraction of RNA. The cytopathic effect in the infected cells was assessed by optical microscopy (Nikon inverted microscope).

Figure 9:
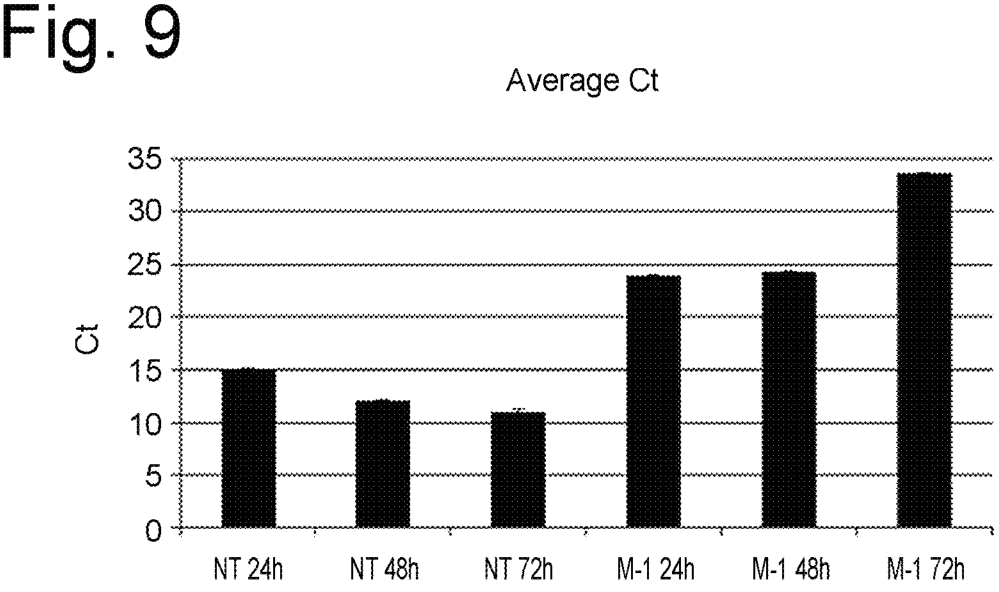
FIG. 9 is a graph showing the increase in threshold cycles (Ct) required to detect RNA of SARS-Cov-2 treated with the embodiment of the polymeric composition of FIG. 7 and then inoculated in cells sensitive to the virus.

Analytical results are expressed as threshold cycles (Ct), namely the cycle in which the target becomes detectable. Average Ct is shown in the graph of FIG. 9, in which "nt" stands for "non-treated" (i.e. control) and "M-1" stands for "treated with M-1".

Table 3 below shows the replication of SARS-Cov-2 in VeroE6 cells after treatment with M-1, replication which is expressed as logarithmic difference compared to the untreated control. The pre-treatment of SARS-Cov-2 with M-1 cause a reduction of 2,665 logarithms of the viral charge at 24 hours post-infection (hpi), a reducation of 3,696 logarithms at 48 hours hpi and a reduction of 6,832 logarithms at 72 hpi compared to the untreated incolumum:

TABLE 3

| Samples | ΔCt | Logarithmic difference |
|---|---|---|
| M-1 24 hpi | 8.855 | −2.665 |
| M-1 48 hpi | 12.278 | −3.696 |
| M-1 72 hpi | 22.7095 | −6.832 |

Figure 10:
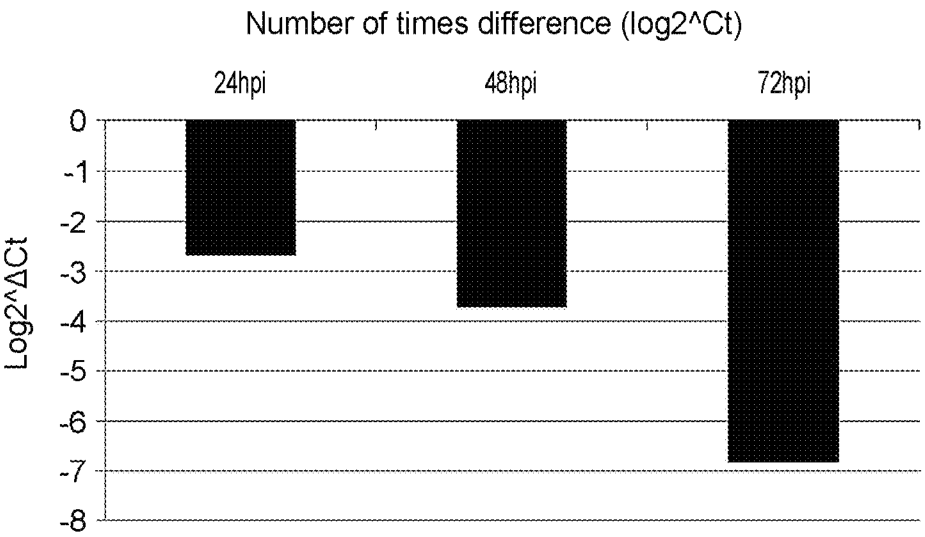
FIG. 10 is a graph showing the number of times difference in viral replication of SARS-Cov-2, treated with the embodiment of the polymeric composition of FIG. 7.

The graph of FIG. 10 represent the difference in viral replication after treatment with M-1. The morphological analysis indicated that the cells infected with the virus treated with M-1 showed a lower cytopathic effect compared to the ones infected with untreated virus. This evidence occurred at all times points of post-infection observation (24, 48 and 72 hours post-infection). In conclusion, the incubation of SARS-Cov-2 for 5 minutes on surfaces treated with M-1 is able to reduce the viral charge. The reduction varies from 460 to 6 million times difference. The molecular data is supported by the morphological analysis of infected cells, showing that the cytopathic effect lowered during invention with the virus treated with M-1 compared to the untreated virus.

Example 10—Evaluation of the Antiviral Effectiveness of M-2 Towards SARS-Cov2

All experiments were performed in a BSL-3 facility. A solution of M-2 in isopropanol, with the same composition reported in Example 6 (Bz 1%, PSS 0.62%), was sprayed onto disposable plastic Petri dishes and left to dry in a biosafety cabinet. Then, 1 ml of SARS-Cov-2 inoculum was incubated in each Petri dish for 5 minutes. After treatment, the virus was used to inoculate human sensitive cells (VeroE6; ATCC® CRL-1586™). Cellular supernatants were collected at 24, 48 and 72 hours post-infection to evaluate viral replication. As a positive control a untreated viral inoculum was used. The replication of SARS-Cov-2 was estimated by qRT-PCR after extraction of RNA. The cytopathic effect in the infected cells was assessed by optical microscopy (Nikon inverted microscope).

Figure 11:
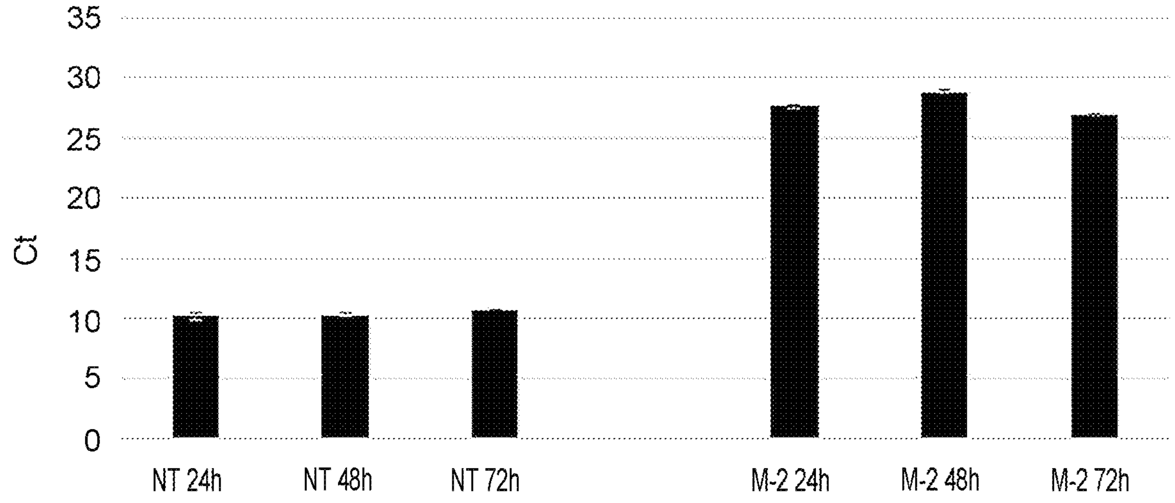
FIG. 11 is a graph showing the increase in threshold cycles (Ct) required to detect RNA of SARS-Cov-2 treated with another embodiment of the polymeric composition according to the invention and then inoculated in cells sensitive to the virus.

Analytical results are expressed as threshold cycles (Ct), namely the cycle in which the target becomes detectable. The threshold cycles are shown in the graph of FIG. 11, in which "NT" stands for "non-treated" (i.e. control) and "M-2" stands for "treated with M-2".

Table 4 below shows the replication of SARS-Cov-2 in VeroE6 cells after treatment with M-2, replication which is expressed as logarithmic difference compared to the untreated control. The pre-treatment of SARS-Cov-2 with M-2 caused a significant reduction of the viral charge at all time points post-infection (hours post-infection: hpi) compared to the untreated virus, with an average reduction of more than 5 logarithms, corresponding to a decrease of over $10^5$:

TABLE 4

| Samples | ΔCt | Logarithmic difference |
|---|---|---|
| M-2 24 hpi | 17.37 | −5.23 |
| M-2 48 hpi | 18.56 | −5.59 |
| M-2 72 hpi | 16.64 | −5.01 |

Figure 12:
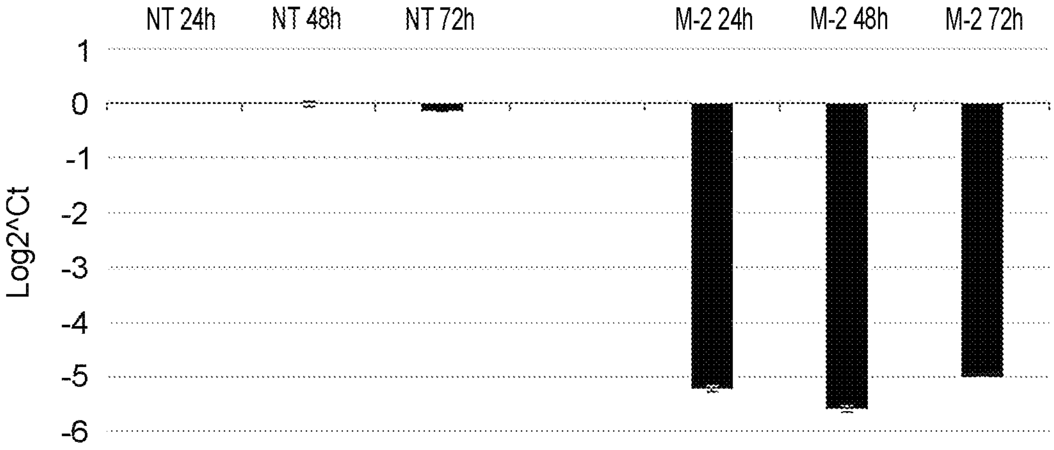
FIG. 12 is a graph showing the number of times difference in the viral replication of SARS-Cov-2, treated with the other embodiment of the polymeric composition according to the invention, compared to untreated SARS-Cov-2.

The graph of FIG. 12 represent the difference in viral replication after treatment with M-2. The morphological analysis indicated that the cells infected with the virus treated with M-2 showed a lower cytopathic effect compared to the ones infected with untreated virus. This evidence occurred at 72 hours post-infection. In conclusion, incubation of SARS-Cov-2 for 5 minutes on surfaces treated with M-2 led to a reduction of the viral charge at 24, 48 and 72 hours post-infection. The reduction is more than 5 logarithms. This decrease of the viral charge is responsible for a reduction of the cytopathic effect, as evidenced by morphological observation at 72 hours post-infection compared to cells infected with untreated virus.

Variation and/or additions of what has been described above are possible.

Even if the polymeric composition according to the invention were prepared mainly on a laboratory scale, the skilled person will be able to appropriately adapt said polymeric compositions to produce them on industrial scale.

In particular, the skilled person will be able to suitably incorporated the polymeric compositions according to the invention into coatings intended for frequently touched objects, as well as medical equipment, face protective masks and air decontamination/air conditioning devices. Similarly, the skilled person will be able to suitably include the polymeric compositions according to the invention in formulations of personal care products, such as hand sanitizer gels.

The invention claimed is:

1. A polymeric composition having antimicrobial activity, said composition being a polymeric salt of anionic polystyrene sulfonate and a cationic component, wherein said cationic component is a positively charged micellar derivative containing benzalkonium cations and a silver complex, and said silver complex is a complex of bi-coordinated silver having the formula:

$$Ag^+[(MPA^{2-})_2]^{3-}$$

wherein $Ag^+$ is a silver cation and $MPA^{2-}$ is the anionic bivalent form of 2-mercapto-4-methyl-5-thiazolacetic acid.

2. The polymeric composition according to claim 1, wherein said benzalkonium cations and said positively charged micellar derivatives are electrostatically bonded to sulfonate anions comprised in said anionic polystyrene sulfonate.

3. The polymeric composition according to claim 1, wherein said antimicrobial activity comprises an antiviral activity.

4. The polymeric composition according to claim 3, wherein said antiviral activity comprises an antiviral activity towards a member of the family Coronaviridae.

5. The polymeric composition according to claim 4, wherein said member of the family Coronaviridae is human Coronavirus 229E or SARS-Cov-2.

6. An alcoholic solution containing the polymeric composition according to claim 1.

* * * * *